US007054031B2

(12) United States Patent
Lee et al.

(10) Patent No.: US 7,054,031 B2
(45) Date of Patent: May 30, 2006

(54) COLOR REPRODUCTION PROCESS

(75) Inventors: David L. Lee, Tacoma, WA (US); Hugh West, Seattle, WA (US)

(73) Assignee: Weyerhaeuser Company, Federal Way, WA (US)

( * ) Notice: Subject to any disclaimer, the term of this patent is extended or adjusted under 35 U.S.C. 154(b) by 1165 days.

(21) Appl. No.: 09/887,867

(22) Filed: Jun. 22, 2001

(65) Prior Publication Data

US 2003/0007164 A1 Jan. 9, 2003

(51) Int. Cl.
G06F 15/00 (2006.01)
G06K 1/00 (2006.01)

(52) U.S. Cl. .......................... 358/1.9; 358/2.1; 358/3.01; 358/3.06; 358/515; 358/520; 382/162; 382/163

(58) Field of Classification Search .................. 358/1.9, 358/2.1, 3.01, 3.06, 515, 520; 382/162, 163
See application file for complete search history.

(56) References Cited

U.S. PATENT DOCUMENTS

| 4,554,241 A | 11/1985 | Edwards | 430/301 |
| 4,998,962 A | 3/1991 | Edwards | 101/211 |
| 5,074,206 A | 12/1991 | Edwards | 101/211 |
| 5,205,211 A | 4/1993 | Edwards | 101/171 |
| 5,982,924 A | 11/1999 | Power et al. | 382/162 |

OTHER PUBLICATIONS

Power, J. L., B. S. West, E. J. Stolnitz, and D. H. Salesin. Reproducing color images as duotones. In *Proceedings of SIGGRAPH 96*, pp 237–248 (1996).
Stolnitz, E. J., V. Ostromoukhov, and David H. Salesin. Reproducing color images using custom inks. In *Proceedings of SIGGRAPH 98*, pp 267–274 (1998).
Southworth, M. Printing color images with two non–process color inks, toners or paints. Technical Asociation of the Graphic Arts, Proceedings, vol. 2, pp 856–861 (1995).
Southworth, M. Two–color separations. *Ink on Paper: Imaging Technologies and Business Strategies*, pp 1–4, Sep. 1996.
Brochure, This is 2 color printing. Markolor Imaging Technologies Inc., Livonia, NY (1993).

*Primary Examiner*—Kimberly Williams
*Assistant Examiner*—Michael Burleson

(57) ABSTRACT

A method of color printing is described in which only two transparent inks are used to reproduce a source image The original digitally encoded image in red, green and blue colors may be initially adjusted for contrast, brightness, color balance, and tonal value. This is then converted to cyan, magenta and yellow encoding. The two of these channels which best represent the dominant colors of original image are then selected. The critical colors of the original image to be reproduced with reasonable accuracy are determined and spot colors that best represent these are selected from an ink palette The spot colors are assigned to the selected channels to which they have the closest color relationship. These two channels are next superimposed to form a composite image and their greyscale values are adjusted to produce an image most closely resembling the desired final image. New positive separations are then made and inverted to negative images from which printing plates can be prepared. A third channel may be introduced approximating the color of a colored substrate before the final greyscale adjustment. This channel is not printed, however. An additional procedure useful with colored substrates is to prepare a masking channel which will deposit an opaque ink, usually white, to underlie the two transparent inks and further help control substrate color. Under this implementation, the third channel is printed. The method is capable of rendering very attractive color images on substrates such as the unbleached kraft paper used for corrugated shipping containers.

31 Claims, 10 Drawing Sheets

(8 of 10 Drawing Sheet(s) Filed in Color)

Fig. 1    Primary Colors
(Additive)

Laydown order: yellow, magenta, cyan

Primary Colors (Subtractive)

COLOR REPRODUCTION PROCESS

The present invention relates to a method of color separation of an original red-green-blue encoded image into a two channel encoding that can be rendered with two transparent inks while achieving remarkable fidelity to the original image. The inks may or may not be process inks. A third channel, not ultimately printed, may be used to approximate medium color This allows the greyscale values of other two channels to be adjusted accordingly for best representation Alternatively, the third channel may be used to define an opaque masking image to be printed prior to or after printing the two transparent inks.

BACKGROUND OF THE INVENTION

Color imaging in graphic arts has been well established for many years. This had normally been done in the past by producing halftone plates from images photographed separately through red, green, and blue filters. The negatives serve as the separation positives for the inks. Printing inks used with these plates are typically the cyan, magenta, and yellow subtractive colors. Very often a fourth plate applying black ink is also used. For particularly critical work additional inks may be added. While traditional lithographic printing relies mostly on transparent inks, the inks used to print corrugated container media are normally opaque. With an opaque ink a later printed image that falls on top of one previously printed will usually completely obscure it. By rendering the original negative separations with cyan, magenta, and yellow (CMY) transparent inks, a wide range of reproduced colors is possible. In addition to their individual ink colors, two inks when overprinted give rise to red (magenta and yellow), green (cyan and yellow), and blue (magenta and cyan). With a three ink overprint a black results.

Color printing on packaging has long been considered necessary for attracting ultimate purchasers to the product. If corrugated shipping containers may be used for an example, the brown color of the unbleached kraft papers normally used does not provide an attractive background for color printing. What color is used is typically an opaque black ink, occasionally with one or two other opaque ink colors. These inks are usually used to print simple illustrations consisting mostly of text, lines and solid fields rather than complex natural images that are intimately intermingled as they would be in a halftone image. Some packages are formed of corrugated containerboard that has a thin white outer surface, so-called mottled white, to support more attractive color graphics. Again, printing of these packages calls for simple art consisting of text, lines and solid fields using primarily opaque inks. More sophisticated (and much more expensive) corrugated packaging may have a preprinted coated white paper laminated over most or all of the outer surface to enable higher quality graphics So-called four color process printing is relatively expensive, both from the standpoint of the presses needed, and the number of inks required. This also has more stringent production requirements; e.g., holding register and controlling density in all four plates. Various investigators have tried to achieve satisfactory color by using simpler methods. Traditional duotone printing is normally done as a halftone using black with one other color. The color provides some improvement in dynamic range but the image is almost entirely carried by the black component. Similarly, two color images have been made using other ink colors, e.g., orange and cyan with very mixed results. Recently, Edwards, in U.S. Pat. Nos. 4,554,241 and 4,998,962,has described a color printing system using superimposed impressions with two different opaque inks. This has been developed commercially into a system called Markcolor by Markolor Imaging Technologies Inc., Livonia, N.Y. It uses an opaque red ink with either an opaque black, green or blue ink. Initial separations are made using exposures through multiple filters. The first separation is made through a red filter followed on the same film by a shorter exposure using a blue filter. The second separation is made through a green filter followed by a short exposure through a blue filter to carry some content in the yellow portion of the spectrum. Separations can now be made using commercially available software such as Adobe Photoshop®, available from Adobe Systems, San Jose, Calif. The resulting two color images approximate the original but with considerable loss of fidelity in some colors.

A recent patent to Power et al., U.S. Pat. No. 5,982,924, describes a model-based algebraic algorithm for printing an image using two inks. The user may select none, one, or both of the colors to be used and enter these choices into the algorithm. The algorithm will extensively sample the available data base of ink colors and choose the best pair of inks for rendering the reproduction, based on minimization of color error between the original and reproduction. It will then suggest additional "best pairs" if requested by the user. Out of gamut colors in the original are mapped onto the smaller gamut defined by the given ink pair. The method takes considerable computing power but leaves some user discretion as to the final results achieved.

To date there has been no truly satisfactory method for approximating a full color image using only two inks The present invention provides a superior solution to this problem using a simple method employing readily available software.

SUMMARY OF THE INVENTION

The invention is a method of making separations for color printing a substrate using only two hues of overprinted transparent ink. The image processing may be done on any of several commercially available software packages. One is Adobe Photoshop® that has been mentioned earlier. Others than might be noted are QuarkXPress™, available from Quark, Inc. Denver Colo.; CorelDRAW® and other packages, available from Corel Corp., Ottawa, Ontario; and Paint Shop Pro, a shareware program available on the Internet. Without intending to endorse one of these programs over any of the others available, the method to be outlined in the following description uses Adobe Photoshop for image processing.

The initial image should be a conventionally encoded 8 or 16 bit digital image in red, green, and blue (RGB). This image may optionally be further adjusted using commercially available software programs, or by other methods, such as visual adjustment of contrast, tonal value, brightness, and color balance. The red, green and blue encoded image is then converted by a mode change to cyan, magenta, and yellow (CMY) encoding. This operation re-expresses the original in CMY units; i.e., it yields three ink separations of the source image in cyan, magenta, and yellow. The pair of separations considered to be carrying the most important color information of the image is visually chosen. The original image is then inspected to determine dominant object colors or other important features critical to the visual impact of the image In like manner, areas of the original image that are not of significant importance that could possibly be rendered in another color are noted. Normally the object will be to reproduce these colors as closely as possible but, in some circumstances, a totally different rendition might be desired.

The next step is to choose from an ink color palette or color swatches two transparent spot ink colors that will best represent the selected dominant object colors. The color of each ink is assigned to one of the two channels chosen from the cyan, magenta, or yellow separations. Preferably, but not always, there is some agreement between the ink color used to print the separation and the color channel that separation represents. As an example, for a cyan separation, reasonable ink choices would be some variation of a cyan, blue, or green ink. In some cases, purposely mismatching color with a channel can lead to interesting and useful effects.

The two channels now rendering the chosen spot colors are superimposed and the resultant composite image inspected. Global and local adjustments may be made in the greyscale values of each channel. This will control the amounts of each ink to be applied in order to produce a color result most closely representing the ultimately desired image. Adjustments may also be made again for contrast, tone, and brightness. Once all greyscale adjustments to both channels are complete new separations may then be made of the two channels for preparation of printing plates by inverting the positives.

The invention is useful for printing on substrates of most colors with the exception of dark greys and black. Even black medium can be used if a third masking channel is added. Substrate color may be simulated as a temporary third spot color channel. This channel will not ultimately be printed, however. Instead, it will serve to enable additional greyscale adjustment of the original two spot color channels. These can be manipulated to offset, or in some instances to take advantage of, the substrate color. For example, printing on a non-white substrate generally calls for reducing the overall ink amounts since not making this correction often yields a dark reproduction. In some cases the substrate can provide a useful and "free" third color which can be exploited to improve the color gamut for the ultimate image. In effect, this creates a third channel that allows the substrate's color to contribute to the overall color of the reproduction.

A further refinement of the method includes providing a masking color using an opaque ink. This will usually be printed first before the selected two transparent spot colors and is a particularly useful technique with colored substrates. The masking color will normally be a white ink but other colors may at some times be useful. Additionally, there may be instances when the opaque masking ink will be applied after the transparent inks in order to achieve some special effect.

One of the anticipated uses of the invention is improved color imaging on corrugated shipping containers made of unbleached kraft-process papers. This so-called brownboard is formed from unbleached kraft liner plies enclosing a corrugated interior ply. In the past this has been typically printed only with opaque inks with very restricted imagery if colors are used at all. The present method is capable of rendering very acceptable color imaging on this and other colored substrates.

It is an object of the invention to provide a color printing method using only two transparent inks to render a full color source image It is a further object to provide a printing method that will produce very acceptable color imaging on colored substrates using only two transparent inks.

It is another object to provide a printing method using only two transparent inks under or over printed with a masking image rendered with an opaque ink.

It is yet an object to provide a method whereby corrugated shipping containers formed from unbleached papers can be printed with attractive colors using only two transparent inks.

It is one more object to provide printed media including shipping containers printed using the process of the invention.

These and many other objects will become readily apparent upon reading the following detailed description taken in conjunction with the drawings

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DETAILED DESCRIPTION OF THE PREFERRED EMBODIMENTS

Figure 1:
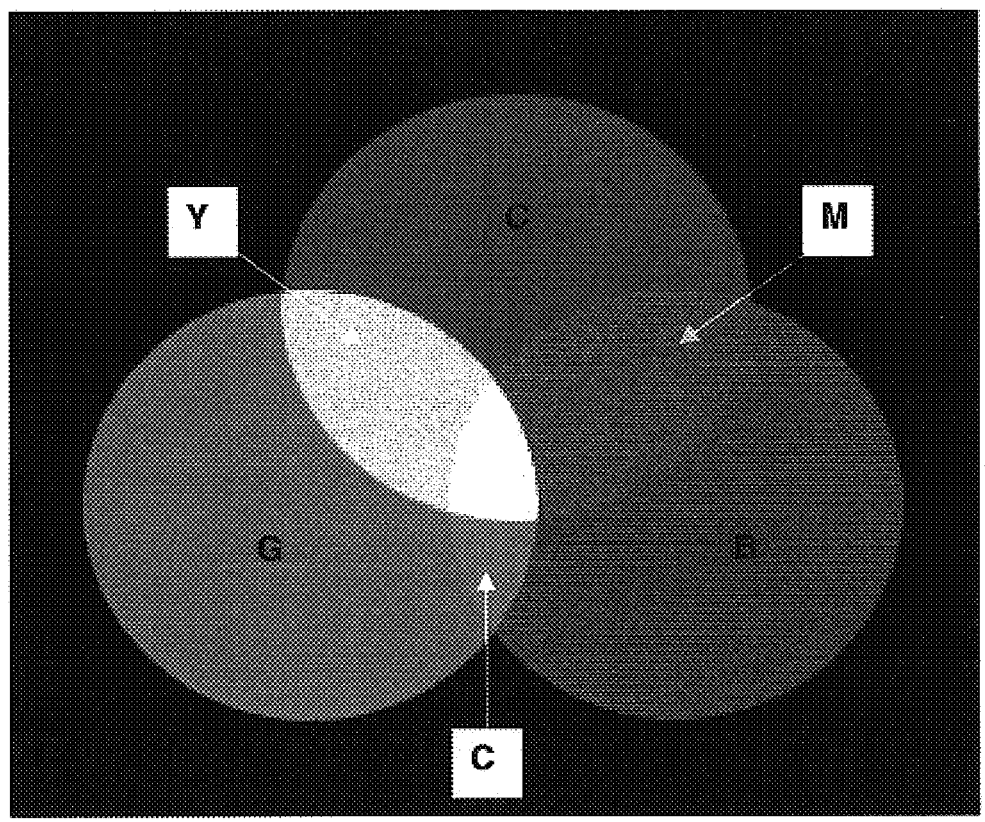
FIG. 1 is a representation of how the three additive primary colors mix to form other colors.

In the description that follows, terms such as "record", "separation", and "channels" will be to some extent be used interchangeably. The term "image record" dates back to the earlier days of process printing when half tone printing plates were derived photographically using contact negatives. Color produced by devices or objects that emit or generate their own light (the sun, TV, etc.) is referred to as an additive color system. Red, green, and blue are known as the additive primaries (FIG. 1). By mixing various amounts of these primaries an incredibly large number of colors can be generated and distinguished. A scene or image was recorded by taking separate photographs through red, green, and blue filters. These provided negative greyscale records of the spectral components. For example, the red record (negative) defined the amount and location of cyan ink (complimentary to red) to be printed. Similarly, the positive of the red record encoded the location and amount of red light being reflected by objects in the original scene. A fourth image provided a record for application of black ink, where that was also used. The three film negatives, referred to as "separations" were then used to prepare printing plates for the cyan, magenta, and yellow inks generally known as "process primaries". These colors, complementary to the red, green, and blue primaries are referred to as "subtractive colors" since they "subtract" or remove by absorption the other colors from the light striking them and reflect or pass only their own color. When colors are produced by objects that do not emit light on their own; i.e., require illumination to be seen, the system is referred to as a subtractive system. This includes virtually all objects viewed by our eyes.

Figure 2:
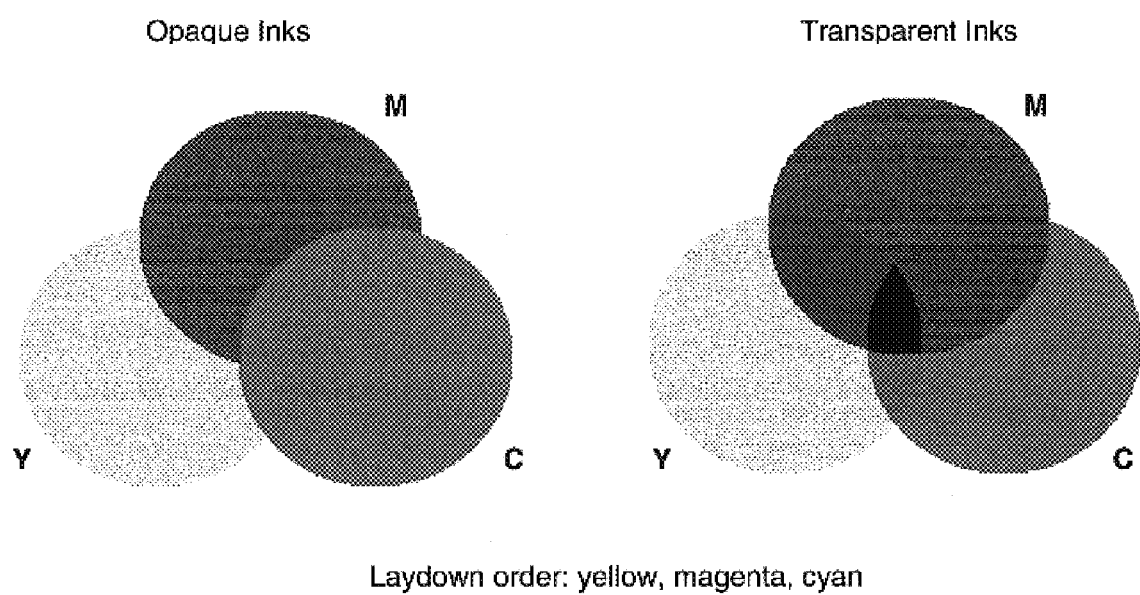
FIG. 2 is a representation of how the three subtractive primary colors when overlaid mix to form other colors.

The three subtractive colors, placed one above the other as transparencies, nominally produce black. On the other hand the subtractive primaries can produce additive colors when in an overlapping arrangement. Thus, red can be produced by a mixture of cyan and magenta, blue from a similar mixture of magenta and yellow, and green from cyan and yellow (FIG. 2). While judicious overprinting of cyan, magenta, and yellow inks can produce a nominal red, green, and blue, it is well known in the printing arts that the size of the color gamut of subtractive primaries used in printing inks is considerably smaller than the gamut of colors defined by the additive primaries.

In many cases CMY ink separations will also be used with a black separation since ink imperfections tend to result in muddy blacks rather than jet blacks when all three inks are overprinted. In this case the separations are referred to as CMYK, the black channel being designated K in order not to confuse it with blue.

Electronic digital imaging changed the techniques considerably and it then became necessary to encode color information using an additive system. Images in such devices as scanners and digital cameras are captured by a myriad of minute sensors equipped with equal numbers of red, green, and blue filters. However, these systems record image positives, in contrast to image negatives on film. The three filters decompose the image into three greyscale positives, usually referred to as "channels". If each channel was inverted to a negative, then they would render separation positives for cyan, magenta, and yellow inks, the so-called "process primaries". Throughout the description that follows "separations" will refer to image negatives while "channels" will refer to image positives. The negatives serve as an encoding record for cyan, magenta, and yellow inks while the positives serve as red, green, and blue records.

The present invention will normally be used with two transparent inks. Characteristics that constitute ink transparency are defined in ISO publications ISO 2846-1 through ISO 2846-5. The invention is not in any way limited to the use of either CMY process inks or inks that simulate the additive RGB colors. These and other inks of any other available color may be used.

The invention is particularly versatile in that it can accommodate the color contribution from the paper substrate; e.g., unbleached kraft paper or papers of other colors. These colors include black if a third masking channel is included This color may in some instances be suppressed by masking and in other cases may be used to contribute to the color pattern of the final image, or both.

The invention first requires an image to be in or converted to CMY positive channels since all separations are made digitally on additive color systems using a computer with a CRT monitor or equivalent display device An original in RGB encoding may be readily converted to CMY (complimentary mapping) or other encoding such as CIE L*a*b* (look-up table mapping). A complementary mapping refers to the color(s) a filter of a given color absorbs. For example, since a red filter passes red (R) light but blocks green and blue light, its complement; i.e., 1–R, yields the amount of non-red light, which is essentially green and blue. Cyan light is a mixture of green and blue light. A look-up table mapping refers to the relationship between RGB and CIE L*a*b* color. Because RGB is a device dependent encoding method, a given RGB triple is associated with a specific L*a*b* color coordinate under an empirical mapping system.

The technician must then make a decision which two channels will convey the most color information to the ultimate rendering. Most usually this will be the cyan and magenta channels since they typically convey at least about $\frac{2}{3}$ or more of the color information. However, other occasions will arise when yellow would be an essential channel to choose. The ultimate choice of channels is scene-dependent. The technician then studies the original image to determine which colors are dominant or most important. It should be noted that while in most cases it is desired to replicate the original colors as closely as possible, situations can arise when considerable departures may be preferred. This is a choice the technician may make depending on the final effect he or she is attempting to achieve. Then two "spot" colors are chosen, usually those that best represent the important original image colors. These usually are "memory colors" or colors that represent specific objects that must be reproduced for the reproduction to appear realistic; e.g., it is desirable that bananas should be yellow. Spot colors might be a green and a red, a red and blue, a yellow and blue, etc. Each of the spot colors will then be assigned to the one of the selected CMY channels. The third channel may remain unused, or as will be explained later, may be used to carry a masking color.

While the present invention is entirely operable using only CMY separations it is preferred to also make RGB separations With six channels the choices for combining two channels are expanded from three (CM, CY, and MY), when using only CMY, to fifteen with CMY and RGB.

In principle, many more ink separations could be produced for specific colors other than RGB and CMY (for example orange) In practice this is not necessary. These six separations reduce the incredibly large number of possible separations to a reasonable, workable number. This is possible because a six-separation color architecture is a good approximation of the intermediate colors lying between any two separation colors; e.g., orange lies between yellow and red. In the above example a yellow or red separation approximates an orange separation. Given their close proximity, either could be rendered with an orange ink despite the fact that we lack the orange separation. Visual adjustment of the greyscale effectively modifies the yellow or red separation to produce an acceptable orange separation. Viewed in this manner, the six proposed separations serve as initial separations from which final ink separations for a unique color can be visually created by global and local manipulation of that channel's greyscale. However, for clarity of explanation only the CMY channels will be considered. Stated again, the problem becomes (1) which image channels (positives) should be selected for deriving ink separations (negatives), (2) which colors of ink should be selected to print those separations, and (3) how are the image channels adjusted to obtain the best separations.

It must once more be emphasized that excellent results can be achieved for most purposes using only the CMY channels.

The term "best" used in the previous sentence should be considered very subjective. Since no two color reproduction can reproduce every color in the original with absolute accuracy, best should be considered to mean "realistic", "esthetically pleasing", or "acceptable for the intended purpose". The technique must rely considerably on subjective evaluation for deriving suitable separations.

Image channel adjustment is achieved by greyscale manipulation. Essentially, this means increasing or decreasing the overall greyscale image density to ultimately result in a greater or lesser amount of ink of the chosen color being applied. This adjustment may be either global or local or both. Global adjustment results in equally varying density of the overall image whereas local adjustment refers to varying density only in a predefined area. These adjustments are well within the capability of the commercially available software programs. By this means the user has considerable latitude over reproduction of the overall scene as well as the color of specific objects within the scene.

While any color ink can be used with a given separation, preferably there is some agreement of the ink color used to print the separation and the color channel that separation represents For example, given a cyan separation, reasonable ink choices would be some variation of a cyan, blue, or green ink. A magenta separation might be used with a magenta, red, or blue ink. Similarly, a yellow separation would preferably be used with a yellow, green or red ink. Since a red separation tells us where and how much red ink to print, straying too far from a red ink will generally yield poor results, especially if accurate reproduction is the goal. It should be noted that purposely mismatching color with a channel can lead to interesting and useful effects and this technique should be considered to be within the scope of the invention If using Photoshop® or a similar image manipulation software program, the source image should first be encoded in RGB mode. Any manipulations to enhance contrast, brightness, saturation, etc. should then be made prior to conversion to CMY mode. After conversion the CMY encoded image should be considered the source image for deriving subsequent separations. The separation channels will come from this image, not the previous RGB encoded image.

Figure 3:
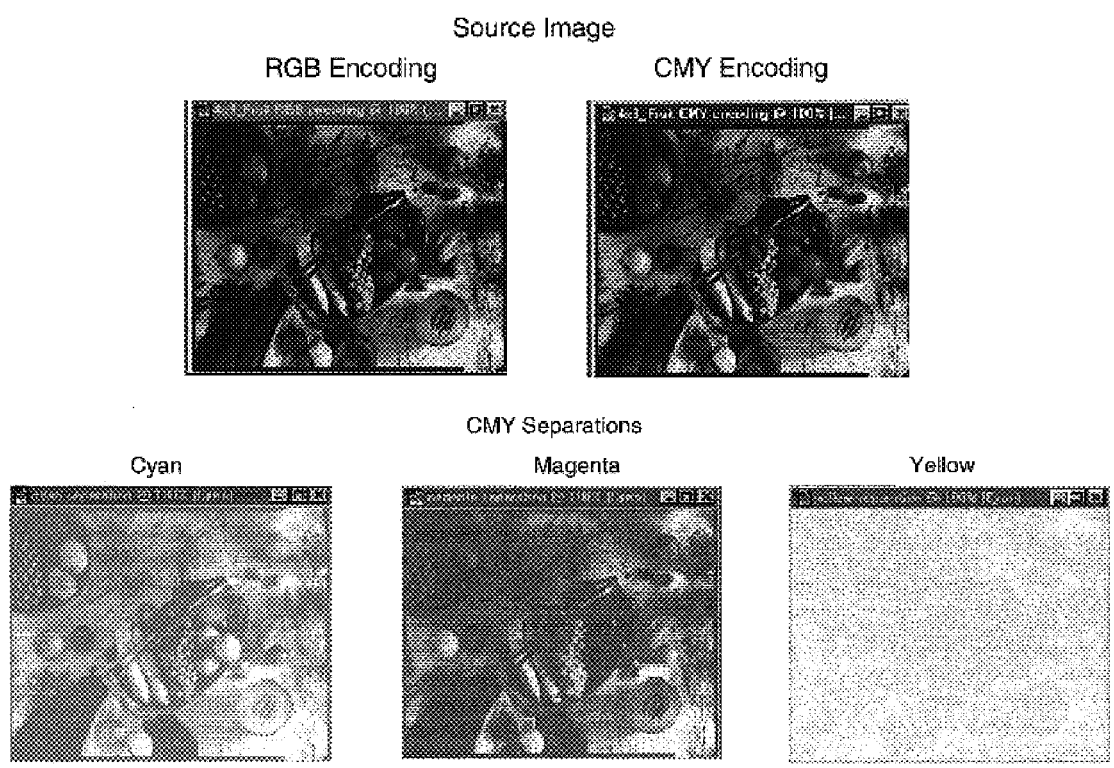
FIG. 3 is a still life image of fruit shown in original RGB encoding, the same image transformed into CMY encoding, and the individual cyan, magenta, and yellow separations.
Figure 4:
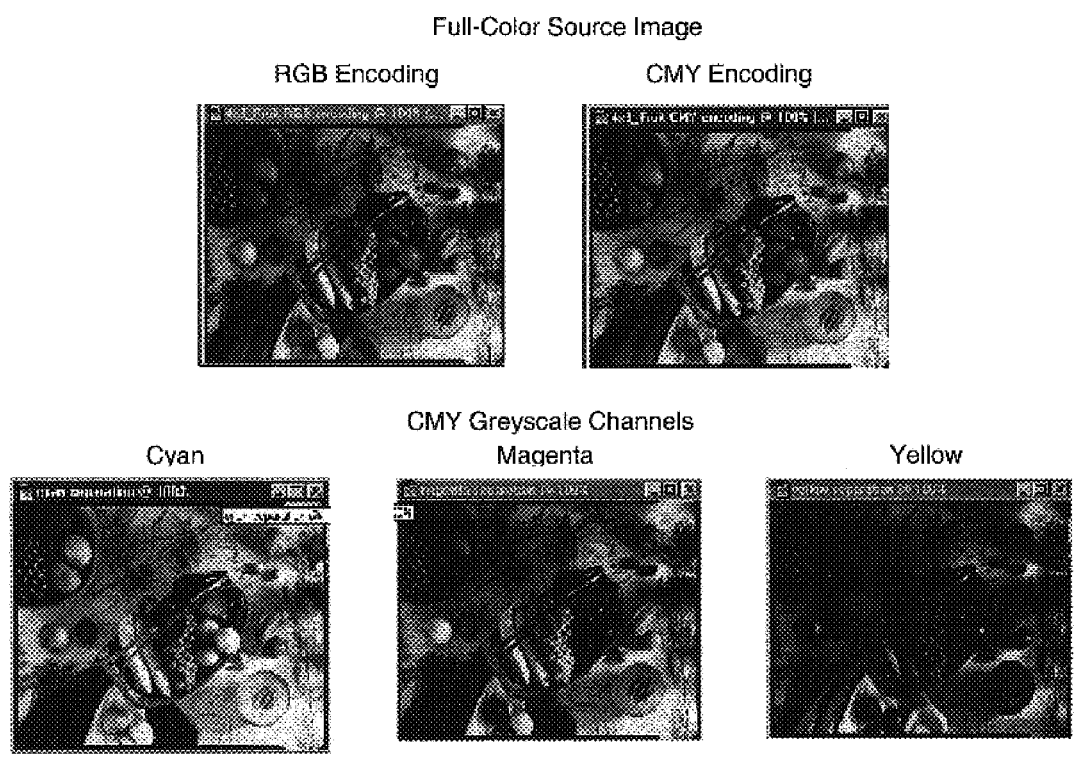
FIG. 4 is similar to FIG. 3 but with the separations shown in positive greyscale.

For purposes of the following description, a still life photograph of mixed fruit on a pale yellow cloth with blue and white napkins will be used as a source image. The dominant colors are green, red, and brown although small areas of yellow, blue, white, and black are present. FIG. 3 shows our sample image in both RGB and CMY modes as well as the cyan, magenta, and yellow separations. It is immediately apparent that the cyan and magenta channels are the most important to the overall image. These same channels are shown as positive greyscale images in FIG. 4 In this example, with the red and green fruits, yellow bananas and lemon, and brown background objects, possible choices would be either red/green or magenta/cyan. Red and green ink colors were selected since these are important memory colors. With magenta and cyan inks it would be difficult to render true reds and greens without a yellow ink also being present. Further, it is important for the inks chosen to be able to render a reasonably good gray or black. The luminance component (black and white signal) is extremely important. Poor grays may make some systems unusable despite the pairs being able to render a large color gamut.

As was noted earlier, for ease of explanation in the present examples only the CMY channels will be considered. However, it is worth noting the significantly greater number of choices when considering six color channels including RGB rather than only the three CMY channels The following table will show all possible channel combinations.

| Separation Pair No. | Selected Primaries | Color Error* | Ranking by Error | Quality of Black |
|---|---|---|---|---|
| 1 | Cyan + Blue | 56.3 | 11 | Poor |
| 2 | Cyan + Magenta | 35.2 | 3 | Good |
| 3 | Cyan + Red | 34.5 | 1 | Good |
| 4 | Cyan + Yellow | 42.3 | 7 | Very Poor |
| 5 | Cyan + Green | 39.7 | 5 | Poor |
| 6 | Blue + Magenta | 35.9 | 4 | Good |
| 7 | Blue + Red | 35.2 | 3 | Good |
| 8 | Blue + Yellow | 41.4 | 6 | Very Poor |
| 9 | Blue + Green | 39.7 | 5 | Poor |
| 10 | Magenta + Green | 67.0 | 12 | Unacceptable |
| 11 | Magenta + Yellow | 44.7 | 8 | Very Poor |
| 12 | Magenta + Green | 34.9 | 2 | Good |
| 13 | Red + Yellow | 50.7 | 9 | Unacceptable |
| 14 | Red + Green | 35.9 | 4 | Good |
| 15 | Yellow + Green | 51.6 | 10 | Very Poor |

*Color error was determined by the measured differences between a multi-color swatch image and its two ink reproduction. The PANTONE ® inks used to render respective separations were PANTONE Red 032 (R), Green (G), Process Blue (B), Process Cyan (C), Process Magenta (M), and Process Yellow (Y). PANTONE inks are available from PANTONE,Inc., Carlstadt, NJ. Note that the major determinant of small color error in the swatch image is the ability to render good greys and blacks.

In the above sets giving good blacks, only one pair, cyan plus magenta, is composed of two of the subtractive primary colors. Three pairs are combinations of additive and subtractive primary colors and two are combinations representing two additive primary colors. However, this does not exclude the possibility of using other channel combinations and these are indeed useful on many occasions. As one example, if the source image possesses dominant colors, such as blue and yellow, other higher error combinations would be preferred. The color content of the source image should not be ignored. Which channels are ultimately selected depends on which best represent the dominant and/or important colors found in the source image.

Figure 5:
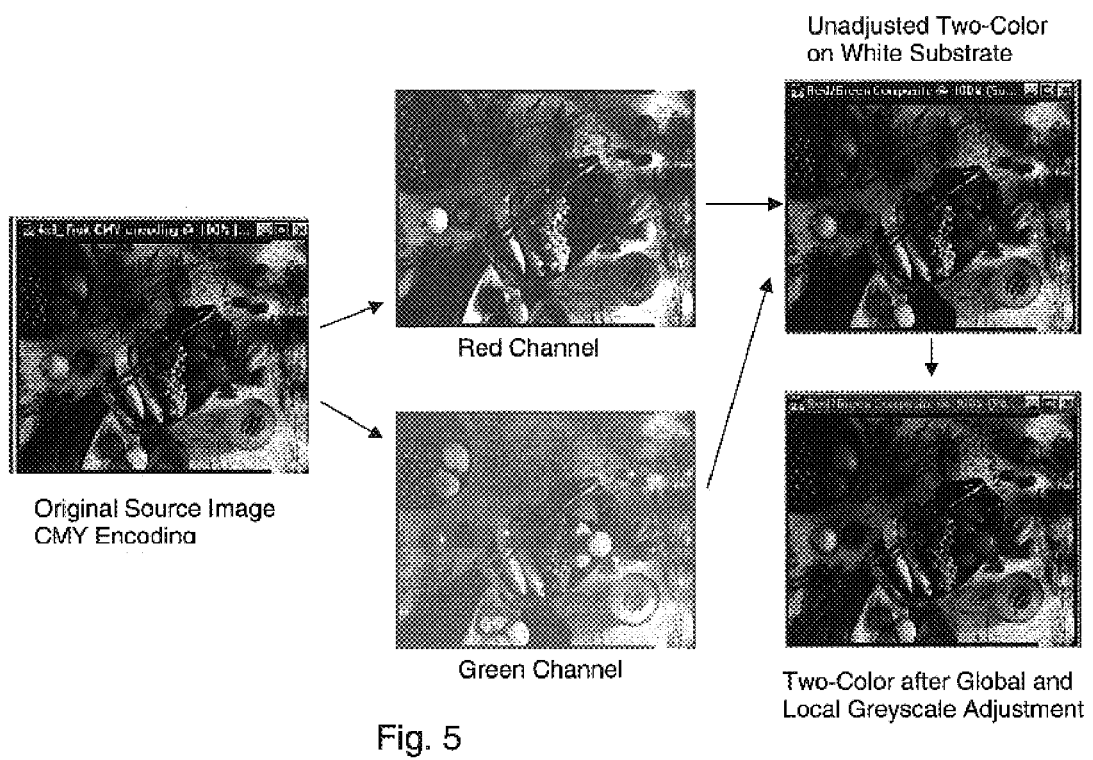
FIG. 5 shows a composite image on a white substrate in which a transparent red ink was used in the magenta channel and a green transparent ink in the cyan channel. One image is shown with original greyscale values unadjusted and a comparison image is shown after global and local greyscale adjustments have been made.

Referring again to the drawings, in FIG. 5 the choice has been made to use the cyan and magenta channels. A further choice has been made from an ink palette to use PANTONE Red 032 and PANTONE Green 360 in the magenta and cyan channels respectively as a first iteration. The yellow channel was not used since this channel, by visual inspection, carries the least amount of color information. As seen in the upper right image of FIG. 5, the combined channels without any greyscale adjustment give a reasonable rendition of the original image. Globally adjusting the greyscale values of the two selected color channels improves the greens and lightens the table cloth. Local greyscale adjustment of the originally blue fabric at the bottom renders it in a pleasing green. While not true to the original color, this was regarded as a relatively unimportant part of the original image. The fruit was the important portion of the image and, except for lighter yellows of the bananas and lemon, is entirely believable. It is important to remember that this was done using only two inks and would ultimately greatly simplify printing and ink costs where precise fidelity to the original was not essential.

Figure 6:
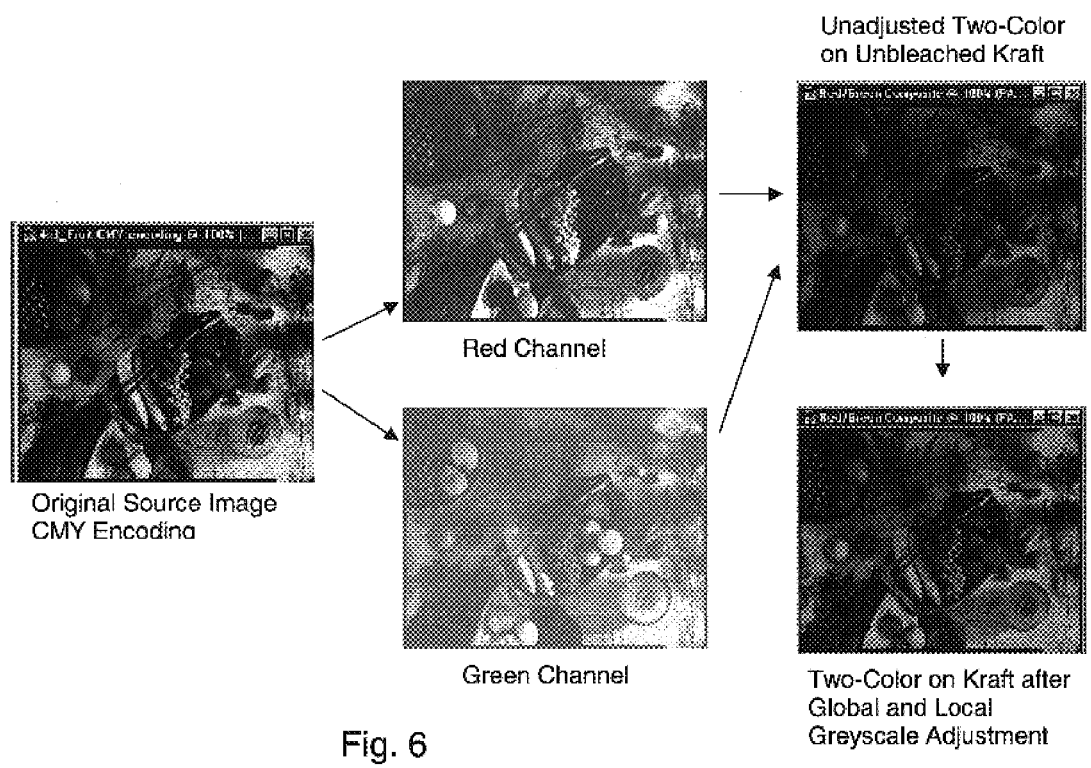
FIG. 6 is similar to FIG. 5 but with the unadjusted greyscale image printed on a simulated brown unbleached kraft substrate before and a comparison image after global and local greyscale adjustments have been made.

If results are not entirely satisfactory or pleasing the above procedure could be readily repeated using other red and/or green ink color choices available from the ink color palette. After all adjustments are made a final separation is created for production of printing plates by merely inverting the positive image for each channel to create a negative, followed then by halftone screening techniques The adjusted image of FIG. 5 is shown printed on a white substrate. Often printing to a white substrate is not possible, the brown color of unbleached kraft corrugated containers being a prime example. To date these containers have almost universally been printed with opaque inks and relatively simple imagery consisting of text, line, and simple colored fields Using the procedure of the present invention attractive, continuous tone, photographic-like images can now be printed on kraft or other substrates, regardless of the medium's color. The upper right image on FIG. 6 shows how the adjusted image of FIG. 5 would appear if printed on an unbleached kraft paper. Paper color is here simulated by using PANTONE 465 in the third (or yellow) and previously unused channel of the original CMY separation and combining it with the other two channels. Note that this is not a conventional three-channel "process" separation. The third channel will not be printed but is added solely for the purpose of adjusting the greyscale values of the other two channels, simulating the presence of a dark or nonwhite substrate. The original red and green channels can be once again adjusted to give the most pleasing rendition on the kraft substrate. The final result is seen in the lower right image of FIG. 6 The color of the kraft paper is actually used to advantage since it restores some of the yellows missing from the FIG. 5 image printed on white paper Again, it is important to remember that the wide range of believable colors achieved on the fruits and background has been achieved by using only two overprinted transparent inks. The bananas in the lower right image on FIG. 6 look yellower than the equivalent image in FIG. 5 since a weak yellow is contributed by the unbleached kraft paper Note that the white cloth left of center at the bottom continues to appear "white" to the eye, even though the system is incapable of producing a white color. This is because the lightest color that can be reproduced is the brown of the substrate, achieved when no ink is deposited.

Where more precise or more dynamic color reproduction might be needed on colored substrates, it is within the scope of the invention to use a third channel to introduce an initially printed masking separation rendered with an opaque ink. While this might be any color, the masking image would most usually be printed with a white ink. The two color channels conveying the important color information in the source image have already largely been determined and attention now focuses on the procedure for finding a suitable channel to serve as a candidate separation to render the masking channel. Again we return to the RGB original and convert it into CIE L*a*b* mode. This operation is a look-up table conversion implemented in commercial software, such as Photoshop, which maps RGB colors to their associated CIE L*a*b* color specifications and vice versa. Only the L* or darkness/lightness channel will be used. The L* channel encodes the achromatic black to white information in the scene (all object information is present). It is a logical choice for rendering the masking channel substrate color to white. This is used to create a third spot channel to simulate the masking ink being printed on the colored substrate. If using Adobe Photoshop or similar software, the L* channel is pasted into a new frame which, for present purposes, might be labeled "White Mask". This will be the initial separation for defining the opaque white ink that will be printed first. Once the L* lightness channel has been pasted, this channel is then rendered with a spot color approximating the color of the substrate. For the present example it is again PANTONE Brown 465. The remaining channels are again the earlier ones containing separations for Green 360 and Red 032 inks.

Figure 7:
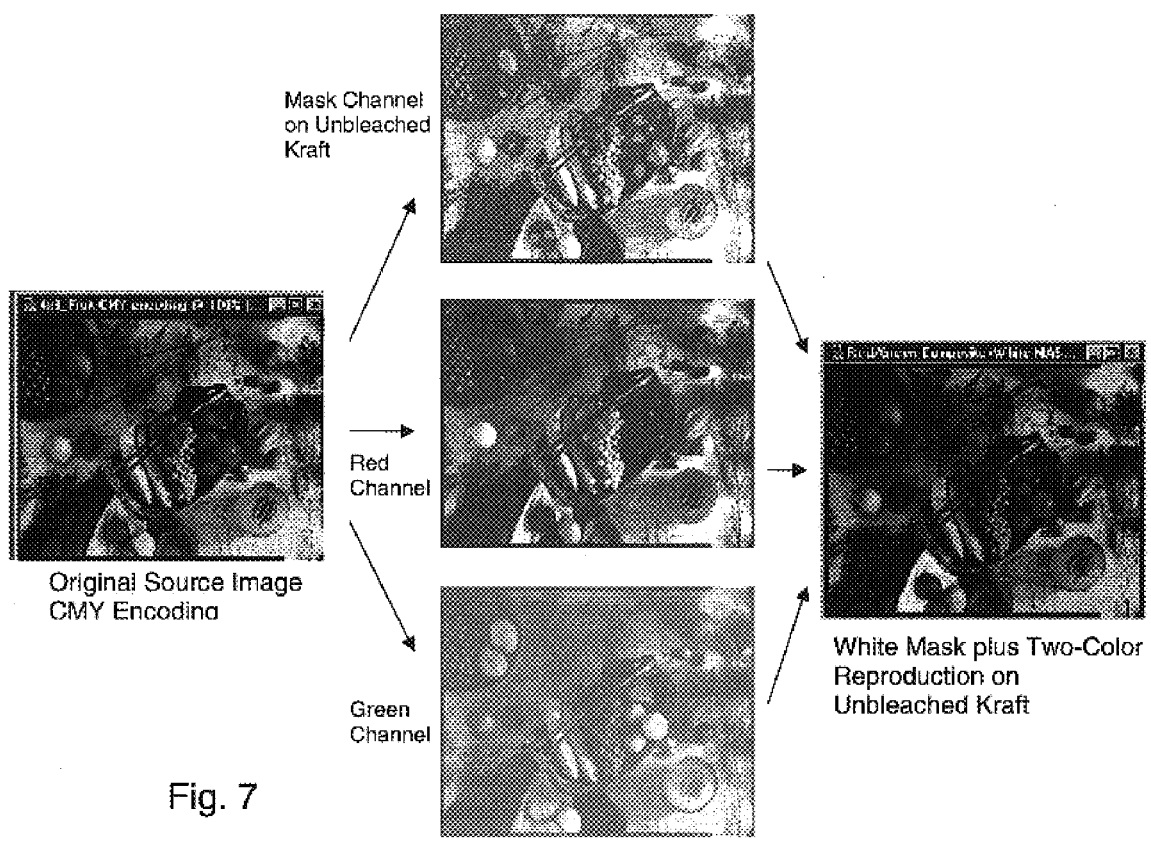
FIG. 7 is similar to FIG. 6 simulating an initial opaque white mask ink printed prior to printing the two transparent inks.

The next step is to make global and local greyscale adjustments in the White Mask channel. The amount of white ink can be increased in areas where high lightness is needed. In shadow areas white ink may be removed to achieve lower luminance. The resultant printed image is seen in FIG. 7 on unbleached kraft stock where the opaque white mask is under-printed before the transparent red and green inks are laid down. The high brightness of the white ink helps to overcome or mask the darkening effect of the kraft substrate.

Figure 8:
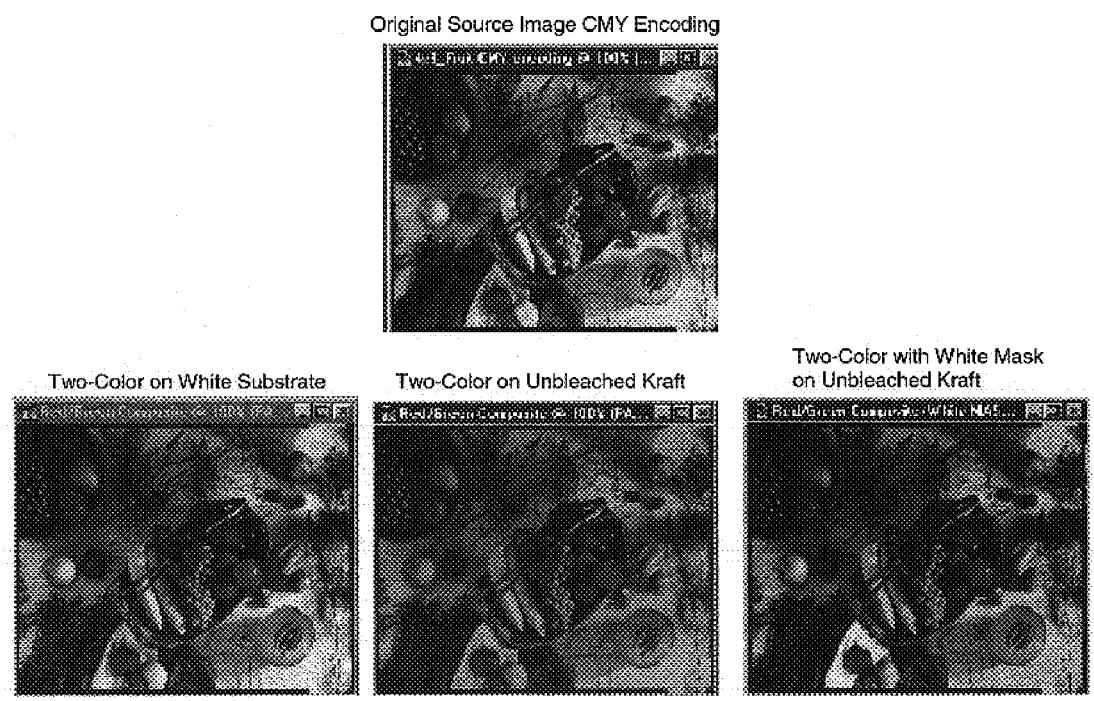
FIG. 8 is a side-by-side comparison of the source image with the two color reproductions as they would look on nominal white stock, on unbleached kraft stock, and on unbleached kraft stock with a white mask preprint.

FIG. 8 shows side-by-side images of the two-color rendition on white and kraft stocks, taken from FIGS. 5 and 6, with the white masked image on kraft stock of FIG. 8. The right and left images are comparable except that the substrate color in the right image has locally been used to advantage. Fidelity with the source image in respect to the important memory colors is remarkably good.

An alternative procedure that on occasions will be useful is to print the opaque masking channel after the two transparent inks have been printed. For example, a localized area of an image might be overprinted with a special spot color, fluorescent or metallic ink, varnish, or any other type of ink to achieve some particular effect.

Figure 9:
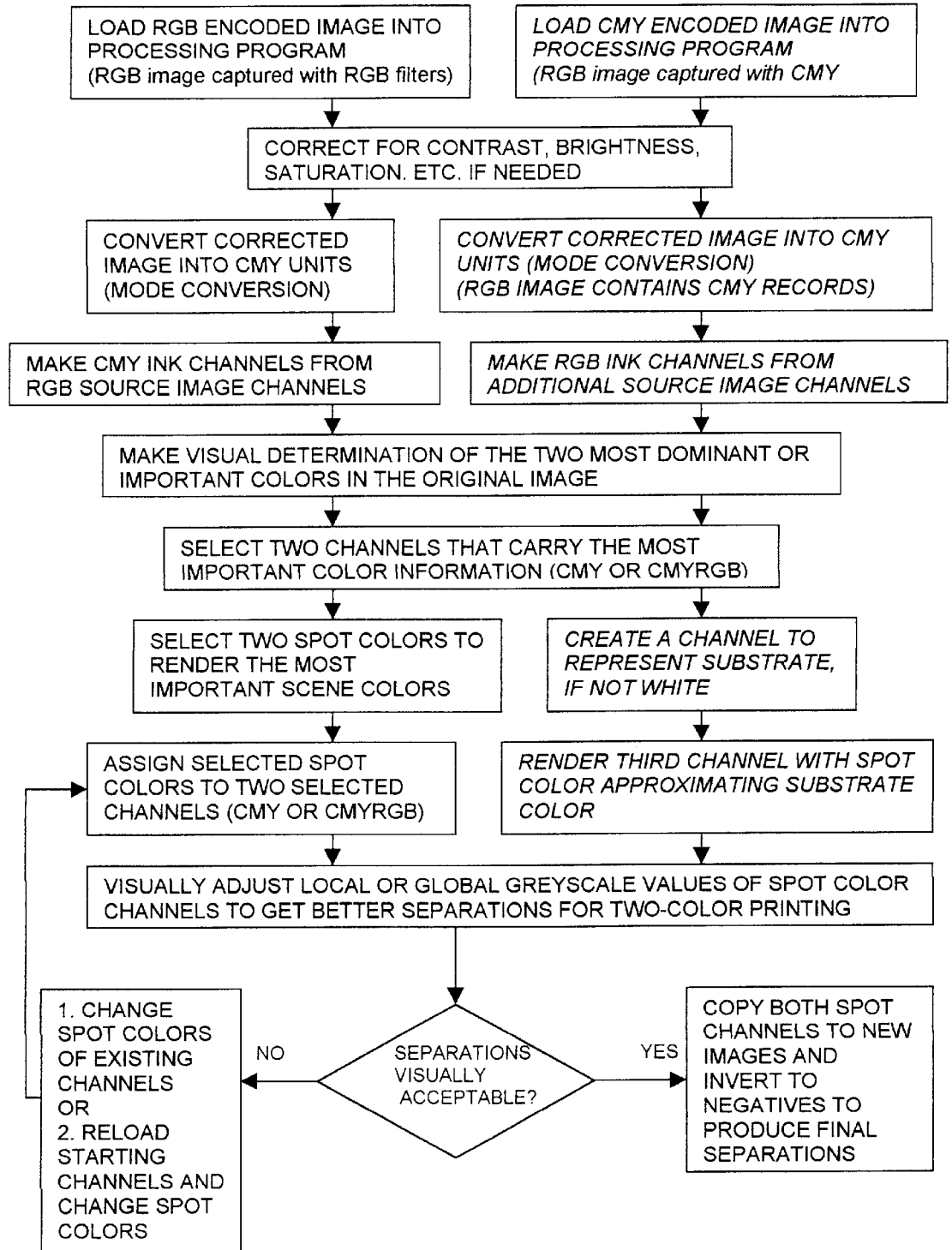
FIGS. 9 and 10 are flow charts summarizing the steps used in practicing the invention.
Figure 10:
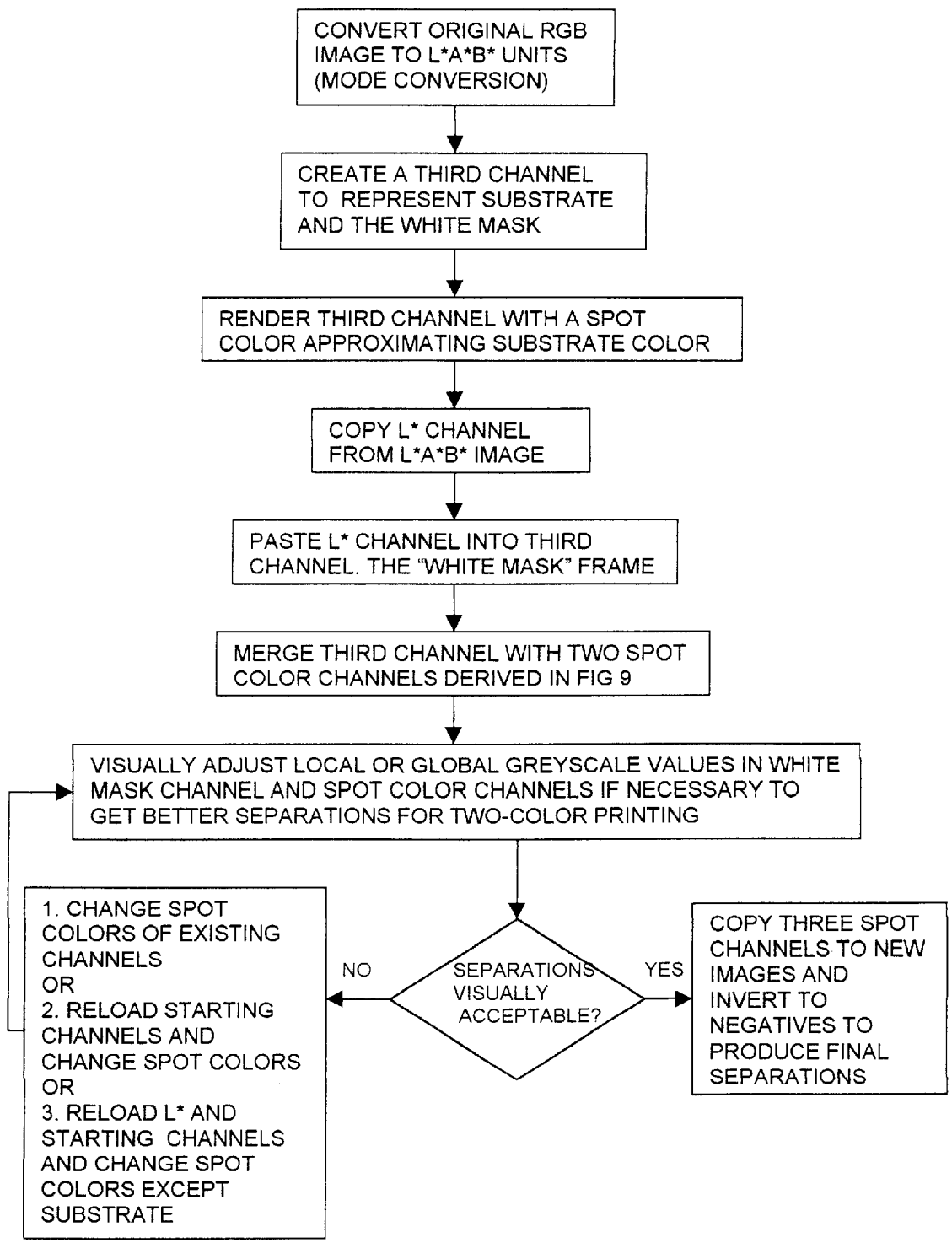

FIG. 9 is a flow chart that provides a summary of the steps used in practicing the invention, exclusive of the use of a masking color. Optional steps are shown in italic type. This shows the necessary procedures for producing the final color separations and includes the variations such as accommodation of colored substrates. FIG. 10 illustrates the steps required when an opaque masking layer is used.

While the most preferred method of practicing the invention has been set forth, it will be evident that many variations not specifically described or exemplified may suggest themselves to those skilled in the art. It is the intention of the inventor that these should be included within the spirit of the invention if encompassed within the following claims.

We claim:

1. A method of making separations for color printing using two overprinted transparent inks which comprises:

providing a red, green, blue (RGB) encoded initial image;

convening the RGB encoded image to a cyan, magenta, yellow (CMY) encoded image;

preparing cyan, magenta, and yellow image separations as source images;

determining visually selected dominant object colors of the original image;

choosing from a color palette two transparent ink spot colors which best represent the selected dominant object colors;

selecting two channels from the cyan, magenta, and yellow source images as first and second channels and assigning a selected transparent spot color to each channel;

superimposing the first and second channels now rendered with the selected spot colors to form a composite image;

adjusting greyscale values of the two superimposed spot color channels to visually produce an image most closely resembling the desired final image; and making new separations of the two channels suitable for preparing printing plates.

2. The method of claim 1 in which the original digitally encoded RGB is initially adjusted for contrast, brightness, color balance, and tonal value prior to conversion to a CMY image.

3. The method of claim 1 that further includes performing global greyscale adjustment of each final separation by manipulating brightness, contrast and tone.

4. The method of claim 1 that further includes performing local greyscale adjustment of each final separation by manipulating brightness, contrast and tone.

5. The method of claim 1 which further comprises providing red, green, and blue separations in addition to the original cyan, magenta, and yellow separations as source images for channel selection.

6. The method of claim 1 or 5 which further includes selecting a spot color similar in color to the printing substrate and including this color in a third channel prior to superposing the first and second channels.

7. The method of claim 6 that further includes performing global greyscale adjustment of each final separation by manipulating brightness, contrast and tone.

8. The method of claim 6 that further includes performing local greyscale adjustment of each final separation by manipulating brightness, contrast and tone.

9. The method of claim 1 in which there is a color relationship between the spot color of ink chosen to print a separation and the color channel represented by the channel.

10. The method of claim 9 in which the spot colors chosen for a cyan channel would be a variation of a cyan, blue, or green ink.

11. The method of claim 9 in which the spot colors chosen for a magenta separation would be a variation of a magenta, red, or blue ink.

12. The method of claim 9 in which the spot colors chosen for a yellow separation would be a variation of a yellow, green, or red ink.

13. The method of claim 1, or 5, which further includes converting the original RGB image to L*a*b* encoding, selecting the L* channel, and combining it as a third channel with the two superimposed channels carrying the spot colors, the third channel rendering an opaque masking color.

14. The method of claim 13 in which the masking color is laid down as an opaque ink prior to application of the two transparent inks.

15. The method of claim 13 in which the masking color is laid down as an opaque ink subsequent to application of the two transparent inks.

16. The method of claim 1 or 5 in which the substrate being printed is paper.

17. The method of claim 16 in which the paper is colored.

18. The method of claim 17 in which the paper is an unbleached kraft paper.

19. The method of claim 18 in which the kraft paper is an outer linerboard of corrugated containerboard.

20. The method of claim 19 in which the corrugated containerboard is formed into a shipping container.

21. The method of claim 6 in which the substrate being printed is paper.

22. The method of claim 21 in which the paper is colored.

23. The method of claim 22 in which the paper is an unbleached kraft paper.

24. The method of claim 23 in which the kraft paper is an outer linerboard board of corrugated containerboard.

25. The method of claim 24 in which the corrugated containerboard is formed into a shipping container.

26. The method of claim 13 in which the substrate being printed is paper.

27. The method of claim 26 in which the paper is colored.

28. The method of claim 27 in which the paper is an unbleached kraft paper.

29. The method of claim 28 in which the kraft paper is an outer linerboard board of corrugated containerboard.

30. The method of claim 29 in which the corrugated containerboard is formed into a shipping container.

31. A paper product printed by the method of claims 1, or 5.

* * * * *

UNITED STATES PATENT AND TRADEMARK OFFICE
CERTIFICATE OF CORRECTION

PATENT NO. : 7,054,031 B2  Page 1 of 1
APPLICATION NO. : 09/887867
DATED : May 30, 2006
INVENTOR(S) : Lee et al.

It is certified that error appears in the above-identified patent and that said Letters Patent is hereby corrected as shown below:

Col. 10, Line 46, should read as follows:

~~convening~~ <u>converting</u> the RGB encoded image to a cyan, magenta,

Signed and Sealed this

Seventh Day of November, 2006

JON W. DUDAS
*Director of the United States Patent and Trademark Office*